April 26, 1966 H. G. ANASTASIA 3,248,727

POSITION CODER DEVICE

Filed Feb. 21, 1963 2 Sheets-Sheet 1

INVENTOR.
HARRY G. ANASTASIA
BY Herbert L. Davis
ATTORNEY

April 26, 1966 H. G. ANASTASIA 3,248,727

POSITION CODER DEVICE

Filed Feb. 21, 1963 2 Sheets-Sheet 2

INVENTOR.
HARRY G. ANASTASIA
BY Herbert L. Davis
ATTORNEY 3,248,727
POSITION CODER DEVICE Harry G. Anastasia, Hillsdale, N.J., assignor to The Bendix Corporation, Teterboro, N.J., a corporation of Delaware Filed Feb. 21, 1963, Ser. No. 260,243
7 Claims. (Cl. 340—347)

Figure 1:
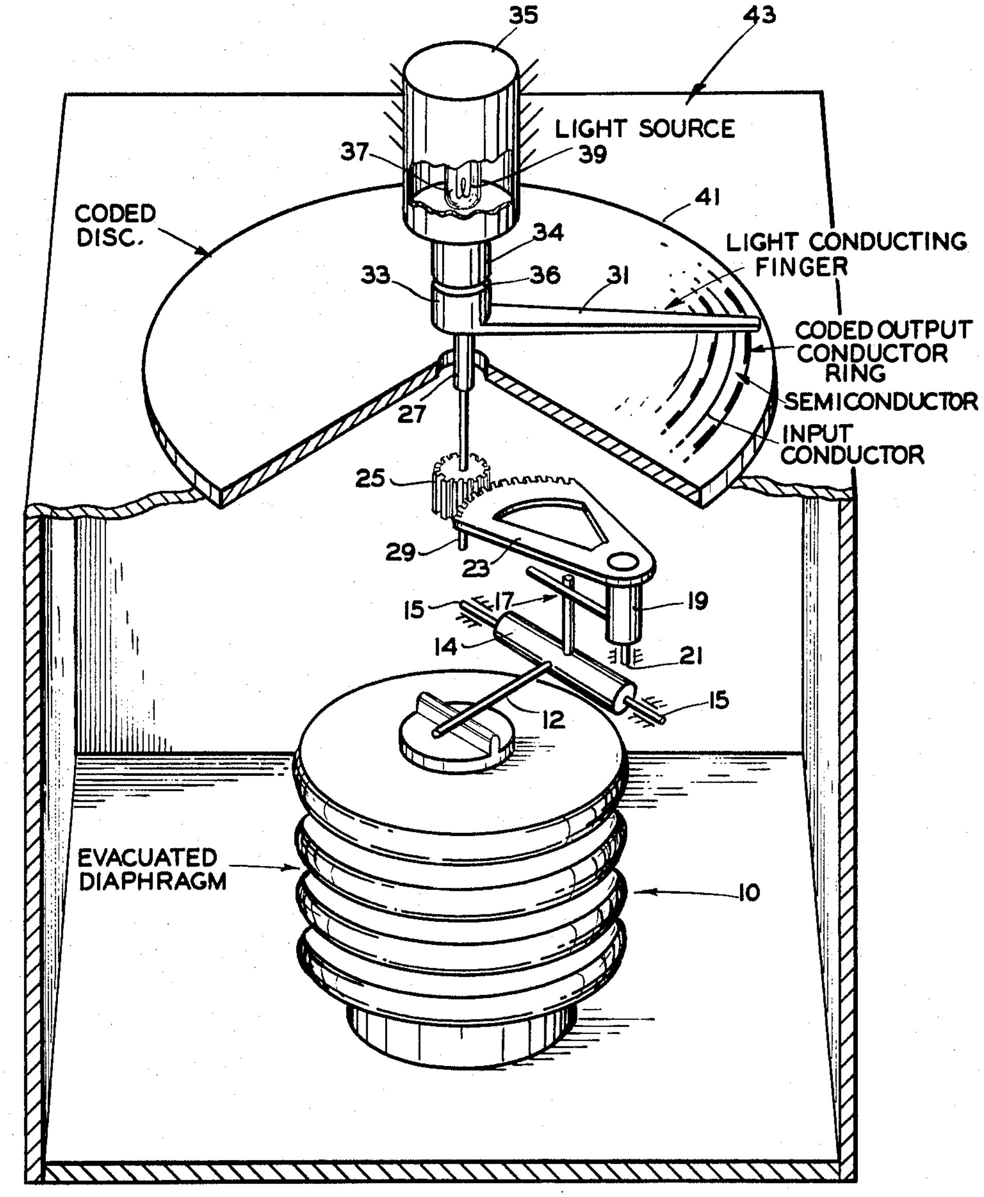

This invention relates to a position coder device to meet low drive torque requirements and more particularly to such a device in which there is provided a light conducting finger angularly positioned by a low torque drive shaft relative to a position sensing code disc including a plurality of alternate serrated annular conductor rings, photosensitive semi-conductors, and cooperating companion conductor rings, all of which are cooperatively arranged in relation to radial segmental hairlines of light focused thereon by the light conducting finger so as to effect a coherent output signal indicative of the angular position of the pointer.

An object of the invention is to provide a position coder device in which a light conductor finger is adjustably positioned by a condition responsive device over a stationary photosensitive disc for operatively controlling suitable electrical circuits leading to a signal output using device such as a transponder or digital computer so as to effect the operation thereof in accordance with the position of the light conductor finger relative to the coder disc.

Another object of the invention is to provide in such a position coder device a photosensitive disc including a first set of alternate serrated annular conductor rings, a second set of alternate annular conductor rings arranged in spaced relation to the serrated conductor rings and photosensitive semi-conductors between the first and second sets of rings and in which the light conductor finger is so arranged in relation thereto as to selectively close electrical circuits between the rings of the first and second sets upon segmental hairlines of light being focused upon the photosensitive semi-conductors between a conductor ring of the second set and an immediately adjacent raised portion of the serrated conductor ring of the first set to provide a conductive path between a ring of the first set and a ring of the second set.

Another object of the invention is to provide a novel shaft position coder in which a light conductive finger is arranged to focus segmental lines of light over a stationary photosensitive coded disc so as to selectively effect electrically conductive paths therethrough and a coded signal indicative of the angular position of the shaft operating light conducting finger relative to the photosensitive coded disc.

Another object of the invention is to provide a novel shaft position coder in which digital representations of the angular adjusted position of the shaft may be effected for operating an output signal using device.

Another object of the invention is to provide a novel shaft position coder particularly suited for the conversion of an angular shaft position to a binary digital encoder output signal with a minimum of friction and under operating conditions requiring a shaft having a low driving torque.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 1 is a schematic view of the shaft position coder as applied to a condition responsive device such as an altimeter adapted for use in an aircraft, and which device may require low driving torque operating conditions for extreme accuracy.

Figures 2, 3:
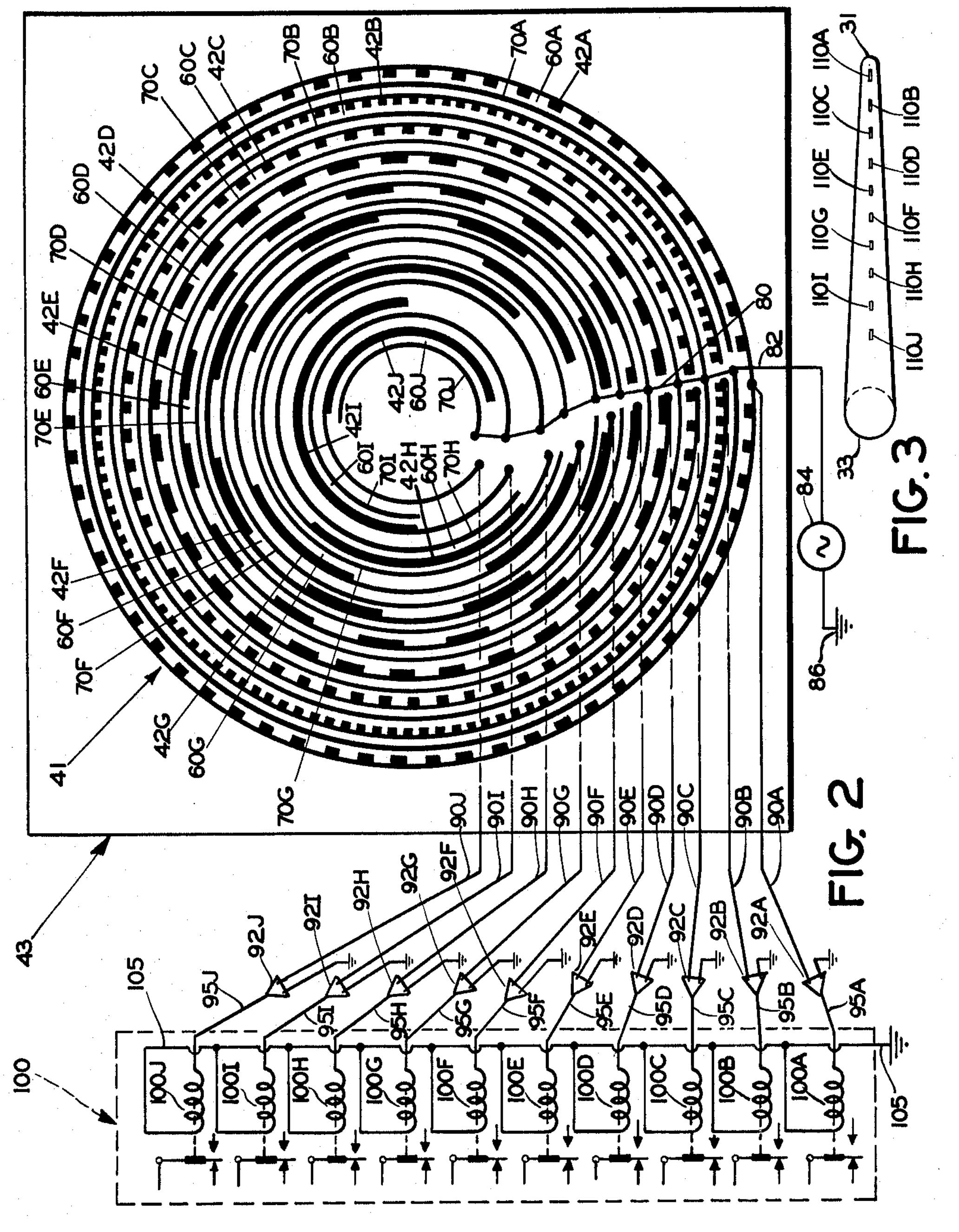

FIGURE 2 is an enlarged plan view of the position coder disc of FIGURE 1 over which a light conducting finger is adapted to be angularly positioned so as to effect coded output signals indicative of the angular position of the finger relative thereto and in which plan view, there is shown the numerous alternate serrated annular rings of an electrical conductive material, semiconductors of a photosensitive material and cooperating companion rings also of a metallic electrical conductive material, all of which may be inlaid in an insulator disc or may be processed by depositing the necessary metallic conductor rings and photosensitive semi-conductor material on an insulated backing board by conventional methods.

FIGURE 3 is an enlarged view of the underside of the light conducting finger and illustrates the apertures therein for focusing dash lines of light onto the photosensitive semi-conductor material between cooperating raised portions of the serrated annular conductor rings and the cooperating companion conductor rings.

Referring to the drawing of FIGURE 1, there is indicated by the numeral 10 an evacuated diaphragm or bellows of conventional type, and which may be arranged to sense the atmospheric pressure at the prevailing altitude of the aircraft carrying the device.

The diaphragm 10 is operatively connected through a suitable linkage indicated by the numeral 12 so as to angularly position a pin shaft 14 about axis 15 to impart through actuating pins 17 movement to a shaft 19 about axis 21 and thereby angularly position a gear 23 in response to movement imparted thereto by diaphragm 10. The gear 23 engages teeth of a pinion gear 25 to impart angular movement to a shaft 27 pivoted on axis 29.

There is further provided a finger 31 of suitable light conductive material and which projects radially from a hub portion 33 affixed to the shaft 27.

The hub portion 33 may be rotatably mounted relative to a fixedly mounted casing 35 having a tubular end 34 spaced from the hub portion 33 by an air gap 36. A suitable source of light such as an electric light bulb 37 having an incandescent filament 39 is mounted in the casing 35.

Rays of light from the source 37 are transmitted through the tubular end 34 of the casing 35 into the hub portion 33. The hub portion 33, as well as the finger 31, includes therein suitable light transmitting means of conventional type, as shown for example in expired U.S. Patent No. 2,071,284, granted February 16, 1937, to Lawrence A. Hyland. The light transmitting means in the hub 33 and finger 31 is so arranged that light rays from the bulb 37 are directed by internal reflection so as to illuminate the interior of the finger 31 which in turn focuses through suitable apertures in the underside thereof of radial dash-like segmental hairlines of light onto the position coder disc 41. The hairline light apertures in the underside of the finger 31 are broken into the small dash-like segments by machined depressions and paint masking for effectively applying dash-like hairlines of light on to the coder disc 41.

The coder disc 41 is shown in greater detail in FIGURE 2 and includes numerous alternate serrated annular rings 42 of a suitable metallic electrical conductive material inlaid in an insulator disc 43 or the same may be of a suitable printed circuit fiberglass board type. The alternate serrated annular rings are indicated by the numerals 42A, 42B, 42C, 42D, 42E, 42F, 42G, 42H, 42I, and 42J, respectively. Further, there is inlaid in the insulator disc 43 photosensitive semi-conductors 60 positioned between the respective serrated annular rings 42 and cooperating companion rings 70 also of a metallic electrical conductive material.

The photosensitive semi-conductors 60 are indicated by the numerals 60A, 60B, 60C, 60D, 60E, 60F, 60G, 60H, 60I, and 60J, respectively. While the cooperating conductor rings 70 are indicated by the numerals 70A, 70B, 70C, 70D, 70E, 70F, 70G, 70H, 70I, and 70J, respectively.

The serrated annular rings 42, the photosensive semi-conductors 60 and the conductor rings 70 may be all inlaid in the insulator disc 43. Further, all of the conductor rings 70 are connected by a common conductor 80 and in turn through a connector 82 to one terminal of a suitable source of alternating current 84. The other terminal of the source 84 is connected to a ground 86.

Further, the serrated conductors 42 are connected by suitable conductors 90 through amplifiers 92 to an output signal using device 100 such as a transponder or digital computer, and which for simplification of illustration has been shown as including suitable control relays operatively connected in the device 100.

Thus for example, the serrated conductor 42A is connected by an electrical conductor 90A to an amplifier 92A and through an output conductor 95A from the amplifier 92A to a relay winding 100A; the serrated conductor 42B is connected by an electrical conductor 90B to an amplifier 92B and through an output conductor 95B from the amplifier 92B to a relay winding 100B; the serrated conductor 42C is connected by an electrical conductor 90C to an amplifier 92C and through an output conductor 95C from the amplifier 92C to a relay winding 100C; the serrated conductor 42D is connected by a conductor 90D to an amplifier 92D and through an output conductor 95D from the amplifier 92D to a relay winding 100D; the serrated conductor 42E is connected by a conductor 90E to an amplifier 92E and through an output conductor 95E from the amplifier 92E to a relay winding 100E; the serrated conductor 42F is connected by a conductor 90F to an amplifier 92F and through an output conductor 95F from the amplifier 92F to a relay winding 100F; the serrated conductor 42G is connected by a conductor 90G to an amplifier 92G and through an output conductor 95G from the amplifier 92G to a relay winding 100G; the serrated conductor 42H is connected by a conductor 90H to an amplifier 92H and through an output conductor 95H from the amplifier 92H to a relay winding 100H; the serrated conductor 42I is connected by a conductor 90I to an amplifier 92I and through an output conductor 95I from the amplifier 92I to a relay winding 100I; and the serrated conductor 42J is connected by a conductor 90J to an amplifier 92J and through an output conductor 95J from the amplifier 92J to a relay winding 100J.

The opposite terminals of the relay windings 100A to 100J are connected through a common conductor 105 to a ground terminal.

As shown in FIGURE 3, the underside of the finger 31 is provided with hairline light apertures 110A, 110B, 110C, 110D, 110E, 110F, 110G, 110H, 110I, and 110J formed by suitable machined depressions and paint maskings so that dask-like segments of light will be focused onto the photosensitive semi-conductive material 60 between the raised portions of each serrated annular electrical output conductor ring 42 and the electrical input conductor ring 70 to close electrical circuits therebetween and from the source of electrical energy 84 to selectively effect through the amplifiers 92A through 92J energization of the relay windings 100A to 100J. However, at recessed portions of the serrated rings 42, the dash-like segments of light will be insufficient in length to close the space between the rings 42 and 70 so that the photosensitive semi-conductive material 60 therein will be non-conductive therebetween so as to be selectively effective to open the energizing circuits for the relay windings 100A through 100J.

The aforenoted arrangement is such that, upon the radial hairline segments of light from the light conductor finger 31 being focused on a raised portion of a serrated conductor ring 42, the immediately adjacent photosensitive semi-conductor 60 exposed to the hairline of light will become conductive of electrical current so as to close a circuit from the raised portion of the serrated ring 42 to the companion ring 70 and thereby effect an energizing circuit for the relay windings in the device 100 to in turn selectively effect operation thereof. However, upon a hairline of light being adjacent to a recessed portion of the serrated conductor ring 42, the photosensitive semi-conductor material 60 adjacent thereto is ineffective to close a circuit to cause energization of the relay windings 100A through 100J controlled thereby.

In the example shown in FIGURE 2, the annular rings 42 and 70 may be fabricated on a painted circuit fiberglass board 43 for effecting an encodement of ten bits for operating a transponder or digital computer 100 in accordance with the angular position of the light conductor pointer 31 relative to the coded disc.

The hairline light apertures 100A–100J on the underside of the pointer 31, as shown in FIGURE 3, break the focused light into small dash-like segments of light. These apertures are effected by machined depressions and suitable paint maskings at the underside of the finger 31 so that a dash of light is provided to cover the light sensitive semi-conductive material 60 between each ring 70 from the source of electrical energy 84 and the raised portions of each companion coded annular ring 42, but the small dash segments of light are insufficient in length to fully cover the light sensitive semi-conductor material 60 between the electrical input conductor ring 70 and the recessed portions of the serrated ring 42 so that in the latter adjusted position of the finger 31 an open circuit will result between the ring 42 and the ring 70.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A shaft angular position sensing device comprising a finger angularly positioned by the shaft, an output signal control device arranged in cooperative relation with said finger, said control device including a first electrical conductor member, a second electrical conductor member, and photosensitive semi-conductor material positioned immediately between the first and second electrical conductor members, the first electrical conductor member having a serrated edge including raised and recessed portions, said finger including means for focusing light rays on the photosensitive semi-conductor material between the first and second electrical conductor members for effecting the passage of an electrical signal from the raised portion of said first member to said second member upon said finger being in one angular position relative thereto, the light focused by said finger being insufficient to cause the photosensitive semi-conductor material to effect a passage of current from the recessed portions of said first serrated conductor member and the second conductor member upon said finger being in another angular position relative thereto, the light rays from said finger being thereby effective to selectively cause the semi-conductor material to open and close electrical circuits between the first and second electrical conductor members in accordance with the angular position of said finger.

2. A shaft angular position sensing device comprising a finger angularly positioned by the shaft, a device for controlling output signals, said device arranged in cooperative relation with said finger, said control device including a first set of electrical conductor members, a second set of electrical conductor members, photosensitive semi-conductor material positioned immediately between the electrical conductor members of said first set and the electrical conductor members of said second set, the electrical conductor members of said second set having serrated edges including raised and recessed portions, said finger including aperture means for focusing light rays onto the photosensitive semi-conductor material between the electrical conductor members of said first set and the electrical conductor members of said second set, the light rays being selectively effective in a first sense to complete circuits for passage of electrical signals through the photosensitive semi-conductor material between the conductor members of said first and second sets upon the light rays focused through the aperture means striking photosensitive semi-conductor material connecting conductor members of said first set and raised portions of the serrated edges of conductor members of said second set, and said finger being selectively effective in a second sense to focus the light rays through said aperture means so as to render the circuits incomplete at recessed portions of the serrated edges of the conductor members of said second set, and said finger being operable in said first and second senses dependent upon the angular adjusted position of said finger effected by the shaft.

3. The combination defined by claim 2 in which each of the electrical conductor members of said second set include serrated edges having raised and recessed portions, the raised and recessed portions of each electrical conductor member having different dimensions and angular positions from the raised and recessed portions of other of said electrical conductor members of said second set whereby upon the light conducting member being angularly positioned by the shaft in cooperative relation with said serrated edges, electrical signal circuits may be selectively rendered effective depending upon the angular adjusted position of said finger by the shaft relative thereto.

4. Means for operatively controlling an output signal using device, said means comprising a condition responsive means, a shaft angularly positioned by the condition responsive means, a finger affixed to the shaft and angularly positioned thereby in accordance with the sensed condition, a device for controlling a plurality of output signal circuits for said output signal using device, said device arranged in cooperative relation with the said finger, said control device including a first set of electrical conductor members, a second set of electrical conductor members, photosensitive semi-conductor material positioned immediately between the electrical conductor members of said first set and the electrical conductor members of said second set, the electrical conductor members of said second set having serrated edges including raised and recessed portions, said finger including aperture means for focusing light rays onto the photosensitive semi-conductor material between the electrical conductor members of said first set and the electrical conductor members of said second set, said finger being effective to selectively render the circuits complete for passage of electrical signals through the photosensitive semi-conductor material between the conductor members of said first and second sets upon the light rays focused through the aperture means striking photosensitive semi-conductor material electrically connecting conductor members of said first set and raised portions of the serrated edges of conductor members of said second set, and said finger being effective to focus the light rays through said aperture means so as to selectively render the circuits incomplete at recessed portions of the serrated edges of the conductor members of said second set, and said finger being so selectively operable dependent upon the angular adjusted position of said finger effected by the shaft so as to selectively effect the electrical control signal circuits for providing the output signals for said output signal using device dependent upon the sensed condition.

5. A position coder comprising a coded disc, a shaft supported centrally of said disc, a finger extending radially from said shaft, overlying said disc and supported for rotation by said shaft, said finger provided, at the side facing said disc, with radially spaced and radially extending apertures, a light source directed downwardly through said apertures to provide a plurality of radially spaced and radially elongated light rays emanating from said apertures, annular radially spaced conductor rings supported on said disc uniformly spaced below said elongated light rays, every other conductor ring having serrations extending radially thereof each connected to provide an output signal with said light rays extending between two adjacent angular conductor rings, photosensitive semi-conductors interposed between said rings operable to absorb the light rays and thereby become conductive to close a circuit between said rings at the serrations of said rings further characterized in that the serrations of the outer ring of said disc are of similar semi-circular segments and the serrations of the inner ring are of relatively larger similar semi-circular segments with a gradual increase of size in a geometric progression, between the outer and the inner serrations thereby forming a multi-digit binary code, whereby the light rays emitted from the finger being effective to electrically connect the adjacent rings at the serration points to produce a reading from the output signal of the serrated rings representing the angular position of said shaft.

6. The structure of claim 5 further comprising a bellows effected by change of ambient pressure and operable to rotate said shaft and thereby position the finger in accordance with the ambient pressure.

7. The structure of claim 6 further comprising a digital computer for receiving the output signals switched on by the elongated light rays of said finger passing over two adjacent rings at the serrations to thereby sense the location of the finger at a position corresponding to the ambient pressure.

References Cited by the Examiner

UNITED STATES PATENTS

| | | | |
|---|---|---|---|
| 2,318,591 | 5/1943 | Couffingnal | 340—347 |
| 3,023,406 | 2/1962 | Jones | 340—347 |

MALCOLM A. MORRISON, *Primary Examiner.*